United States Patent
Gehring et al.

(10) Patent No.: US 7,290,804 B2
(45) Date of Patent: Nov. 6, 2007

(54) PLUG CONNECTION BETWEEN A CORRUGATED HOSE AND AN UNPROFILED PIPE

(75) Inventors: Matthias Gehring, Straubenhardt (DE); Peter Foitzik, Schellbronn (DE)

(73) Assignee: Witzenmann GmbH, Pforzheim (DE)

( * ) Notice: Subject to any disclaimer, the term of this patent is extended or adjusted under 35 U.S.C. 154(b) by 347 days.

(21) Appl. No.: 10/387,785

(22) Filed: Mar. 13, 2003

(65) Prior Publication Data
US 2004/0178633 A1    Sep. 16, 2004

(51) Int. Cl.
    *F16L 21/06* (2006.01)
(52) U.S. Cl. .................................. 285/322; 285/903
(58) Field of Classification Search ................ 285/39, 285/243, 370, 903, 322, 150.1, 151.1, 154.2, 285/154.1, 323
See application file for complete search history.

(56) References Cited

U.S. PATENT DOCUMENTS

| | | | |
|---|---|---|---|
| 4,457,544 A | | 7/1984 | Snow et al. |
| 4,923,220 A | * | 5/1990 | Guest et al. ................. 285/39 |
| 6,764,102 B2 | * | 7/2004 | Ezura .......................... 285/903 |
| 2003/0116960 A1 | * | 6/2003 | Yates .......................... 285/39 |
| 2004/0135369 A1 | * | 7/2004 | Schroter ..................... 285/903 |

FOREIGN PATENT DOCUMENTS

| | | |
|---|---|---|
| DE | 82 27 425 U1 | 1/1983 |
| DE | 298 18 788 U1 | 2/1999 |
| DE | 197 46 354 A | 4/1999 |
| DE | 299 05 709 U | 6/1999 |
| DE | 100 31 729 A1 | 2/2002 |
| EP | 1167855 A2 * | 1/2002 |
| FR | 1 531 470 A | 7/1968 |
| FR | 2 655 126 A | 5/1991 |

* cited by examiner

*Primary Examiner*—Aaron Dunwoody
(74) *Attorney, Agent, or Firm*—Volpe And Koenig P.C.

(57) ABSTRACT

Plug connection between a corrugated hose and an unprofiled pipe. A plug connection is provided between a corrugated hose (1) and an unprofiled pipe (31), a holding element (3, 34, 50) that surrounds the unprofiled pipe (31) being connected at least indirectly with the hose end (4), and the end (31) of the unprofiled pipe being surrounded by a sealing ring (16, 17, 30) that is situated before the holding element (3, 34, 50). The sealing ring is connected at least indirectly with the hose (1) so as to form a seal. It is provided that the holding element (3, 34, 50) is situated in the hose end (4) and is held thereby, at least indirectly, by mutual positively locking engagement in the axial direction, and that on the other side of the seal (17, 18, 30) a guide sleeve (18, 25) having an inner diameter that corresponds to the outer diameter of the unprofiled pipe (31) is situated before the holding element (3, 34, 50). The sleeve is held radially by the hose (1) practically play-free, and at least indirectly, by mutual positively locking engagement in the axial direction.

24 Claims, 4 Drawing Sheets

PLUG CONNECTION BETWEEN A CORRUGATED HOSE AND AN UNPROFILED PIPE

BACKGROUND

The invention relates to a plug connection between a corrugated hose and an unprofiled pipe, the end of the hose being connected at least indirectly with a holding element that surrounds the unprofiled pipe for holding the unprofiled pipe, and the end of the unprofiled pipe being surrounded by at least one sealing ring that is situated before the holding element in the direction towards the hose, the sealing ring being connected at least indirectly with the hose to form a seal.

A plug connection of this sort is made for reasons of assembly or revision, among others, if components through which a medium flows are first connected during their assembly and are then brought to the site, and are for example folded, or if such components must be exchanged or removed from their working position for testing or maintenance. In all cases, the cited component must be moved after the flow connection has been created. For this reason, the initially corrugated hose is situated in the flow connection as a flexible element. On the other hand, the plug connection promotes the simple production of the flow connection through simple plugging of the unprofiled pipe, which is for example situated at the component side, into the holding element connected with the corrugated hose, in such a way that a tight flow path is created without requiring the use of assembly tools, etc.

As a rule, the material used for the corrugated hose and unprofiled pipe, as well as for the other parts forming the plug connection, is metal, in particular stainless steel or copper. However, according to the particular requirements of the individual case, the use of plastic can also be desirable, sufficient, or appropriate.

In known plug connections, the arrangement is made in such a way that the holding element is situated together with the sealing ring in a basic element, made for example of brass, whose end facing away from the plug opening for the unprofiled pipe is clamped, with the aid of a clamping nut, against the end of the hose, this screw connection likewise requiring sealing, with the aid of suitable known materials, and requiring for this purpose a corresponding construction of the hose end, enabling the connection. This design, provided in order to create the possibility of the plug connection, is clearly expensive and consumes a large amount of space, due to the number and size of the components used as well as the additional manufacturing measures, so that, given a corrugated hose as a flexible connecting element, this design is responsible for a significant part of the production cost.

SUMMARY

The object of the present invention is therefore to provide a different design of a plug connection of the type cited above, such that the number of components and sealing points required, and the space required, are reduced significantly; i.e., the plug connection is significantly simplified, so that there is a notable lowering of the production cost for a corrugated hose provided with terminals for a plug connection.

According to the present invention, this object is achieved in that the holding element is situated in the end of the hose, and is held by the hose end at least indirectly through mutual positively locking engagement in the axial direction, and that, on the other side of the seal, a guide sleeve having an inner diameter that corresponds to the outer diameter of the unprofiled pipe is situated before the holding element, and is held radially by the hose, practically play-free, and is held at least indirectly through mutual positively locking engagement in the axial direction.

These measures according to the present invention have the effect that the above-designated housing-shaped basic element can be omitted, including the clamping nut required for its fastening at the hose end, and including other constructive measures, as well as the additional sealing means connected therewith. Rather, the holding element, for whose reception the basic element was previously required, can be situated immediately in the hose end and can be fixed there in the required manner, so that the end of the unprofiled pipe can be plugged immediately onto the hose end constructed in this manner. Here, the guide sleeve, attached in the corrugated hose at a distance from the holding element, is used to avoid a tilting of the end of the unprofiled pipe inside the plug connection, which could negatively affect the functioning of the seal situated before the holding element.

Through the mentioned omission of components, and the immediate replacement thereof by the material of the hose end itself, the present invention results in a savings that is considerable enough that the costs for the production of the plug connection are reduced to a fraction of the previous production costs, without requiring a significant outlay. In particular, however, the plug connection according to the present invention also increases the reliability of the tightness of the connection, because this connection is now ensured only at one point, by the sealing ring alone, in contrast to the previous production of a tight connection, which was required at at least two points.

In order to simplify assembly, and for other reasons to be addressed below, it has proved useful that the end segment of the hose that receives the holding element and guide sleeve is extended in the direction towards a flattening of the hose corrugations; i.e., in relation to the rest of the corrugated hose it has a relatively flat corrugation. If, now, in accordance with a further feature of the present invention the sealing ring is placed from the inside into a corrugation of the hose situated between the holding element and the guide sleeve, there results, in a particularly notable manner, an increase in the sealing force exerted by the sealing ring, given the normally occurring inner pressure stress in the constructive unit in question, under which a corrugated hose seeks to stretch axially; with regard to the sealing ring, this results in a radial loading in the direction towards the end of the unprofiled pipe.

If, in a useful development of the subject matter of the present invention, at least two sealing rings are situated in adjacent hose corrugations, these can be connected with one another by a bridge that overlaps the corrugation trough, situated between the hose corrugations, of the hose profiling, outside the outer contour of the unprofiled pipe, thus creating a constructive unit that is particularly stable even against axial movements of the end of the unprofiled pipe. In addition, as a result of the relatively flat corrugation of the hose end it can be provided that the sealing ring has a lens-shaped axial cross-section, adapted to the elongated hose corrugations.

As for the holding element, it can have holding fingers that extend into the hose parallel to the axis thereof and that are situated uniformly around the periphery at a distance from one another in the circumferential direction and that can be moved radially in flexible fashion within limits, these fingers extending from a terminal support ring that is positioned essentially in the end of the hose and is closed over its periphery and if necessary corresponds in its inner diameter to the outer diameter of the end of the unprofiled pipe. The holding fingers can have at their free ends an inwardly-directed bend for the frictional arresting of the unprofiled pipe, the bends extending, in the relaxed state of the holding fingers, radially inwardly into the region of the outer cross-section of the unprofiled pipe. That is, the inner diameter encompassed by the holding fingers in the relaxed state is smaller, by a degree that is predetermined, in the sense of the production of sufficient holding forces, than the outer diameter of the unprofiled pipe. For further improvement it can also be provided that at the ends of the bendings, an angled edge can be formed for at least frictional seating on the unprofiled pipe. This can even produce a certain positively locking connection if the holding element is made of metal, through radial penetration into the material of the end of the unprofiled pipe.

In a further construction of the subject matter of the invention, it can be provided that the free ends of the holding fingers have a thickened portion that is directed radially outward and that extends into an associated corrugation of the hose, and that the holding element has, in the area of the end of the holding fingers connected to the support ring, a flange that runs around the periphery, in externally interrupted fashion if necessary, and that extends into an associated corrugation of the hose, whose cross-section is smaller in the direction of the hose axis than is the corresponding cross-section of the hose corrugation, and that the axial distance between the thickened portions of the holding fingers and the flange is fashioned such that the holding element can be displaced axially between a position in which the thickened portions do not contact an axially adjacent edge of the associated hose corrugation and a position in which the thickened portions are loaded radially inward by the edge, axially adjacent in the direction towards the hose end, of the associated hose corrugation, in the direction of a pivoting of the holding fingers.

Through these measures, on the one hand the flange forms the positively locking connection between the hose end and the holding element. On the other hand, the axial displaceability, which places stress on the holding element, in connection with the thickened portions of the holding fingers allows an amplification of the holding force exerted by these thickened portions. This is because when the end of the unprofiled pipe, together with the holding element seated thereon with a frictional fit, tries to move out of the hose in the direction towards the hose end under the normally prevailing interior pressure load of the corrugated hose, it carries along with it the holding element via the frictional connection with the bending of the holding fingers, through which the thickened portions of the holding fingers are pressed against the cited corrugation edge. This in turn leads to a radially inward loading of the ends of the holding fingers, and thus to an increase of the frictional force between bends of the holding fingers and the end of the unprofiled pipe, and results in a centering and a radial holding of the end of the unprofiled pipe.

On the other side, the holding element can be easily assembled through insertion into the end of the hose, if the radial expansion of the flange on the one hand and the thickened portions of the ends of the holding fingers on the other hand are not chosen too large. For then, under the radially inward pivoting of the holding fingers that takes place, the holding element can be plugged so as to lock into the described position, from which it cannot move once the end of the unprofiled pipe has been plugged in, because then the thickened portions of the ends of the holding fingers, which have been pivoted further outward radially by the plugging in of the end of the unprofiled pipe, remain hanging on the cited edge of the hose end.

In a further development of the subject matter of the present invention, it can additionally be provided that the support ring of the hose end protrudes outward, and has there at its end a collar that extends radially outward and that is always axially at a distance from the hose end. This collar then forms a handle for the easier grasping of the holding element, so that for a disassembly of the end of the unprofiled pipe it can be pushed into the hose end far enough that the thickenings of the holding finger ends become free of the cited corrugation edge, and thus the end of the unprofiled pipe can be withdrawn from the holding element.

According to another construction of the subject matter of the present invention, it can be provided that the holding element is formed by a lock washer placed into a corrugation of the hose end, and that the lock washer has, extending from a ring element, flexible tongues that are distributed uniformly over the periphery and that extend from the hose end radially inward in oblique fashion, in the direction towards the hose, and that the cross-section described by the free ends of the flexible tongues is smaller than the outer cross-section of the end of the unprofiled pipe, and that the outer diameter of the lock washer, or of the ring element thereof, is smaller than the outer diameter of the associated hose corrugation, but is greater than the free inner cross-section of the hose. As a consequence of this design, the holding element is given a particularly simple construction, which is space-saving above all in the axial direction, and an undesired detachment of the plug connection is prevented in that the flexible tongues dig in to the outer covering of the end of the unprofiled pipe, and the end of the unprofiled pipe is thus simultaneously centered and held or supported radially.

In order to enable the assembly of the lock washer, it has a parting line that extends over its entire radial cross-section. This makes it possible to contract the lock washer radially far enough that it can be introduced into the hose end and can expand into the desired hose corrugation. If, now, the end of the unprofiled pipe attempts to detach from the plug connection under the normally prevailing interior pressure, thus bringing about the already-mentioned digging in with the flexible tongues, the lock washer can expand radially only until the outer circumference of its ring element comes to be seated in the associated hose corrugation.

In order to form a plug connection of this sort in detachable fashion, it can be provided that an unlocking sleeve having an inner diameter corresponding to the outer diameter of the end of the unprofiled pipe is situated in the hose end, before the lock washer in the direction towards the opening of the hose end, and that the unlocking sleeve protrudes axially outward with its one end, and that the flexible tongues can be pivoted radially outward by the other end of the unlocking sleeve, upon the corresponding axial displacement thereof, and thus move out of engagement in relation to the end of the unprofiled pipe.

In order to simplify the handling here, the one end of the unlocking sleeve can have a collar that extends outward radially and that is situated at a distance axially from the hose end.

In order also to situate the unlocking sleeve in the hose end in captive fashion, it is useful that the one end of the unlocking sleeve be formed as a ring that is closed over its periphery, having an inner diameter corresponding to the outer diameter of the end of the unprofiled pipe, and that the rest of the length of the unlocking sleeve has longitudinal slots whose axes are parallel and that are distributed uniformly over the periphery and are open towards the other end of the unlocking sleeve, and that the remaining length of the unlocking sleeve has a flange that runs around the periphery in externally interrupted fashion and that protrudes into an associated hose corrugation, and whose cross-section is smaller, in the axial direction of the hose, than the corresponding cross-section of the hose corrugation, and that the flange has an axial position on the unlocking sleeve, enabling the axial displacement of the unlocking sleeve in order to pivot the flexible tongues.

The guide sleeve in both the embodiments described above can have on its end situated further from the hose end a tapering of the inner cross-section, as an axial stop for the end of the unprofiled pipe, and can have on its other end a collar that protrudes outward radially for positively locking engagement in an associated hose corrugation. Here, the radial expansion of the collar can be limited in such a way that the guide sleeve can be brought into its position with a slight radial widening of the corrugated hose, and this position can be determined in that the taper of the end of the guide sleeve having the inner cross-section impacts on the unstretched further part of the corrugated hose, which naturally has a smaller free inner diameter than does the stretched part of the hose end. Another possibility can be that the guide sleeve is constructed with a longitudinal slot of a certain length, so that it can be pressed together radially somewhat for the assembly.

Finally, in the above-described embodiments according to the present invention it can be provided that a hollow cylindrical support sleeve is situated externally on the hose that axially overlaps the segment of the hose end, up to and including the area occupied by the guide sleeve, and whose inner diameter corresponds to the outer diameter of the hose end that is secured against axial displacement by terminal bends that grasp the corrugations of the hose. Thus, this support sleeve contributes to the stabilization of the plug connection, in that it additionally maintains the axial alignment of the guide sleeve, the sealing ring, and the holding element.

According to yet another development of the basic idea of the present invention, it can be provided that the guide sleeve has an essentially hollow cylindrical extension that extends up to the end of the hose, and that a positively locking engagement is given between the components formed in this way and the hose, at least against axial displacement towards the hose end, and that the component bears on its outer covering at least one sealing ring that enters into sealing engagement with an associated hose corrugation, and that the extension has at least one inner annular chamber for the reception of the sealing ring for the unprofiled pipe, and that the holding element is situated in the extension at its end facing away from the guide sleeve. Thus, here the arrangement is made in such a way that the components that form the plug connection are combined to form a closed construction unit that can then be plugged in locking fashion into the hose end, creating the possibility of pre-assembling the construction unit in finished fashion outside the hose, or of storing it in this pre-assembled form without the associated corrugated hose.

In this context, it is useful that the extension has an outer cross-section that is larger than the guide sleeve, and is situated in a hose cross-section is correspondingly widened.

Furthermore, in this embodiment it can be provided that the positively locking engagement between the components and the hose is given by locking projections that are uniformly distributed on the extension over at least one circumference, and that protrude radially outward into an associated hose corrugation, and that the locking projections have on the side facing away from the hose end an oblique surface that forms a low angle with the direction of the hose axis. In this way, at the locking projections a ramp is formed that facilitates the plugging of the named construction unit into the hose end in a locking manner.

As for the construction of the holding element, it can be provided that the holding element has holding fingers that extend into the extension parallel to the hose axis and that are spaced uniformly over the periphery at a distance from one another in the circumferential direction and that can be moved radially in flexible fashion within limits, these fingers extending from a terminal support ring that is positioned essentially in the area of the free end of the extension and is closed over its periphery and if necessary corresponds in its inner diameter to the outer diameter of the end of the unprofiled pipe, and that the holding fingers have at their free ends inwardly-directed bends for the frictional arresting of the unprofiled pipe, the bends extending, in the relaxed state of the holding fingers, radially inward, into the region of the outer cross-section of the unprofiled pipe. This construction of the holding element thus essentially corresponds to that of the holding element used in the first-named embodiment, so that the statements made in relation thereto are correspondingly valid here.

It can now also be provided that an angled edge is provided on the bends at their end, for at least frictional seating on the unprofiled pipe. In addition, it can here specifically be provided that the free ends of the holding fingers have a thickened portion that is directed radially outward, and that protrudes into a radial widening of the free inner cross-section of the extension, and that the outer cross-section of each thickened portion is connected with the outer surface of the associated holding finger via a beveled surface that extends in the direction towards the support ring and that forms a low angle in relation to the axial direction of the hose end, and that the widening has a beveling that corresponds to the oblique surfaces.

If, in this embodiment, the support ring likewise protrudes outwardly past the free end of the extension, and there has at its end a collar that extends radially outward and that is always at a distance from the end of the extension, a handle is then also thus created that facilitates a detaching of the plug connection under discussion.

Finally, the guide sleeve connected in one piece with the extension can have, at its end that is situated further away from the free end of the hose or of the extension, a tapering of the inner cross-section as an axial stop for the end of the unprofiled pipe.

BRIEF DESCRIPTION OF THE DRAWINGS

Further features and details of the invention are apparent from the following description of specific embodiments that are shown in the drawings.

DETAILED DESCRIPTION OF THE PREFERRED EMBODIMENTS

Figure 1:
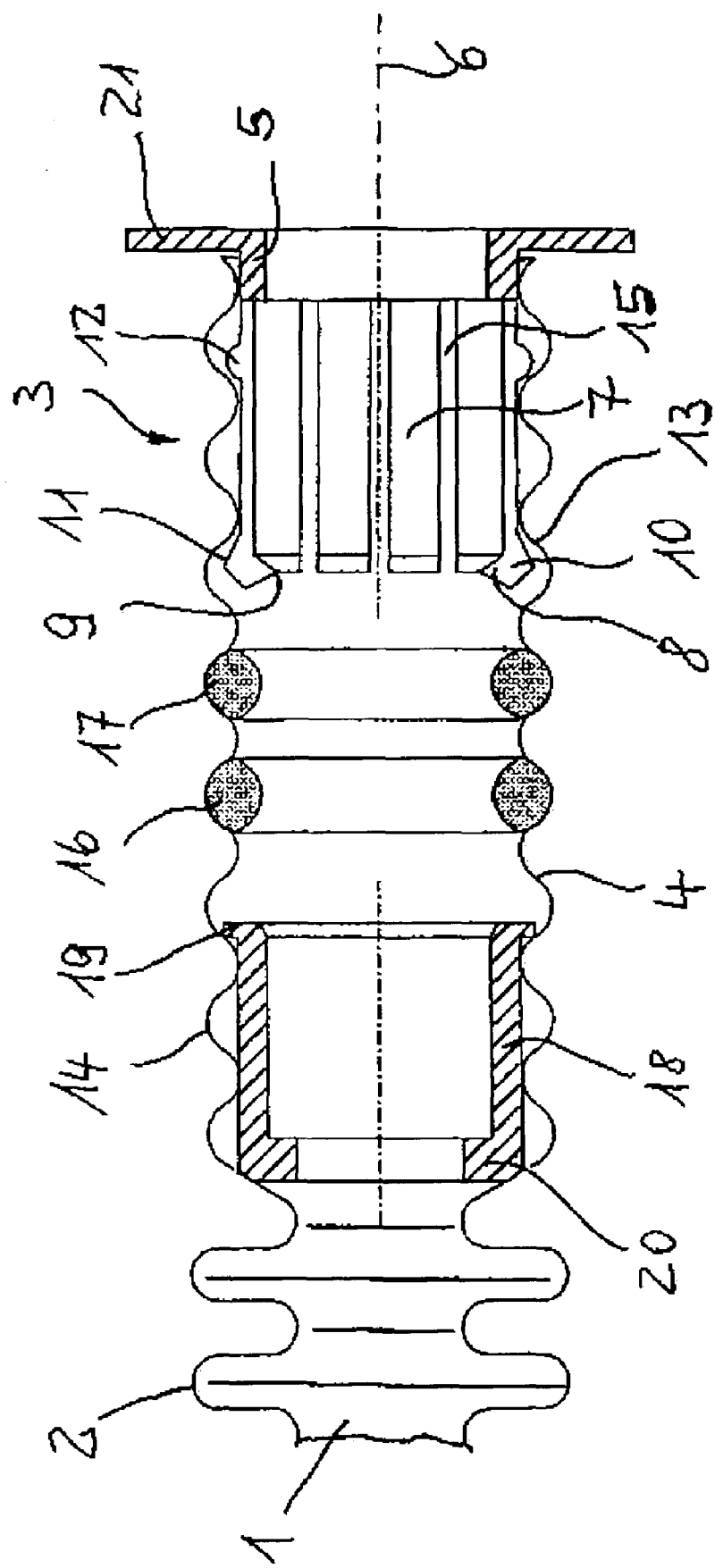
FIG. 1 shows a hose end having a first embodiment of a plug connection, in axial section.

FIG. 1 shows one end of a hose 1, made for example of metal, having annular corrugations 2. A holding element 3, made for example of plastic, is placed into the hose end and is connected therewith in positively locking fashion via its outer contour. This holding element 3 has a terminal support ring 5 that is essentially positioned in hose end 4 and is closed over its periphery, and whose inner diameter corresponds to the outer diameter of an end (not shown) of an unprofiled pipe, and from which there extend holding fingers 7 that extend in parallel and are spaced uniformly over the periphery, and can be moved radially in flexible fashion within limits, due to their mutual spacing from one another. The holding fingers have at their free ends a radially inwardly directed bend 8 for the frictional arresting of the mentioned end of the unprofiled pipe, for which purpose the bends 8 extend inward, in the relaxed state of holding fingers 7, into the area of the outer cross-section of the unprofiled pipe. In order to create a better frictional connection, the bends are equipped with an angled edge 9 at their ends.

In addition, the free ends of holding fingers 7 each have a thickened portion 10 that is directed radially outwardly and that protrudes into an associated corrugation of hose end 4, and that transitions, via an oblique surface 11, onto the outer contour of associated holding finger 7. Moreover, in the area of the end of holding finger 7 connected to support ring 5 there is provided a flange 12 that runs in externally interrupted circumferential fashion, and that extends into an associated hose corrugation and whose cross-section in the direction of hose axis 6 is smaller than the corresponding cross-section of the cited hose corrugation. Here it is provided that the axial distance between thickened portions 10 and flange 12 is formed such that holding element 3 can be displaced between a position in which thickened portions 10 do not contact an axially adjacent edge of the associated hose corrugation and a position in which thickened portions 10 are loaded by edge 13, which is axially adjacent to the hose end, of the associated hose corrugation, in the direction of a radially inward pivoting of holding fingers 7.

As can be seen from the drawing, hose end 4 is axially extended in relation to the rest of the hose, so that flatter hose corrugation 14 are formed on this end, which form a smaller outer diameter in relation to hose corrugation 2, as well as a greater inner diameter. Holding element 3 can now be pushed into the hose end fashioned in this way with radial pivoting in of holding fingers 7; given a corresponding distance 15 between holding fingers 7, the thickened portions 10 can be pivoted radially inward far enough to enable the assembly of holding element 3.

Axially adjacent to holding element 3, in adjacent corrugations of hose end 4 there are situated two sealing rings 16, 17, which have a lens-shaped cross-section corresponding to the flat formation of corrugations 14, and whose inner diameter corresponds in the required manner to the outer diameter of the end (not shown) of the unprofiled pipe. The two sealing rings 16, 17 can be optionally be connected with one another by a bridge 47 (illustrated in connection with the embodiment of FIG. 2) that overlaps the corrugation trough, situated between the hose corrugations, of the hose profiling, outside the outer contour of the unprofiled pipe, thus creating a constructive unit that is particularly stable even against axial movements of the end of the unprofiled pipe.

In the axial direction further from holding element 3, stretched hose end 4 finally accepts a guide sleeve 18 whose inner diameter corresponds to the outer diameter of the end (not shown) of the unprofiled pipe, and whose outer diameter corresponds to the inner diameter of the stretched hose end. In the plugging direction, the guide sleeve automatically finds its axial stop at the unstretched segment, extending further inward radially, of hose 1, as well as with a terminal radial collar 19 on an edge of a corrugation of the stretched hose end; the outer diameter of collar 19 should be dimensioned such that guide sleeve 18 can be pushed into the depicted position with a slight widening of hose end 4. Moreover, in order to give the end (not shown) of the unprofiled pipe an axial stop, the guide sleeve has a radial taper 20 on the end situated in front, in the plugging direction of the end of the unprofiled pipe.

If, in the arrangement described in this way, an unprofiled pipe is plugged in, this pipe passes bends 8 of holding fingers 7 with radial widening of the cross-section, and subsequently, with corresponding radial displacement, passes sealing rings 16, 17, and finally passes guide sleeve 18, until it impacts against taper 20. In this position, the end of the unprofiled pipe is held by the frictional connection formed by the bends 8. A detachment of this connection, in particular under the internal pressure prevailing in hose 1, is not possible. This is because here the end of the unprofiled pipe carries holding element 3 along with it towards the right (as seen in FIG. 1), with the result that oblique surfaces 11 run against adjacent corrugation edge 13. This causes the impacting of the free ends of holding fingers 7 with a force that is directed radially inward and that increases the frictional connection between the end of the unprofiled pipe and bends 8, and thus blocks a further movement of the end of the unprofiled pipe out of the plug connection, while however on the other hand also causing a centering and radial holding of the end of the unprofiled pipe, so that the inner diameter of support ring 5, matched to the outer diameter of the end of the unprofiled pipe, is not required for this purpose.

In order on the other hand to enable a disassembly of the described plug connection, it is correspondingly necessary to prevent holding element 3 from carrying out the described migration along with the end of the unprofiled pipe that is to be withdrawn from the connection, or to hold it fast against this entrained migration. In order to enable this, or to facilitate it, support ring 5 is formed so as to protrude past hose end 14, and is provided at its free end with a collar 21 that extends radially outward and that is always at an axial distance from the hose end; this collar can serve as a handle in order to push holding element 3 to the left, as seen in FIG. 1, into hose end 14, or to hold it fast axially, so that the oblique surfaces 11 cannot reach the edge 13, and consequently no increase of the frictional connection between bends 8 and the end of the unprofiled pipe can occur.

Figure 2:
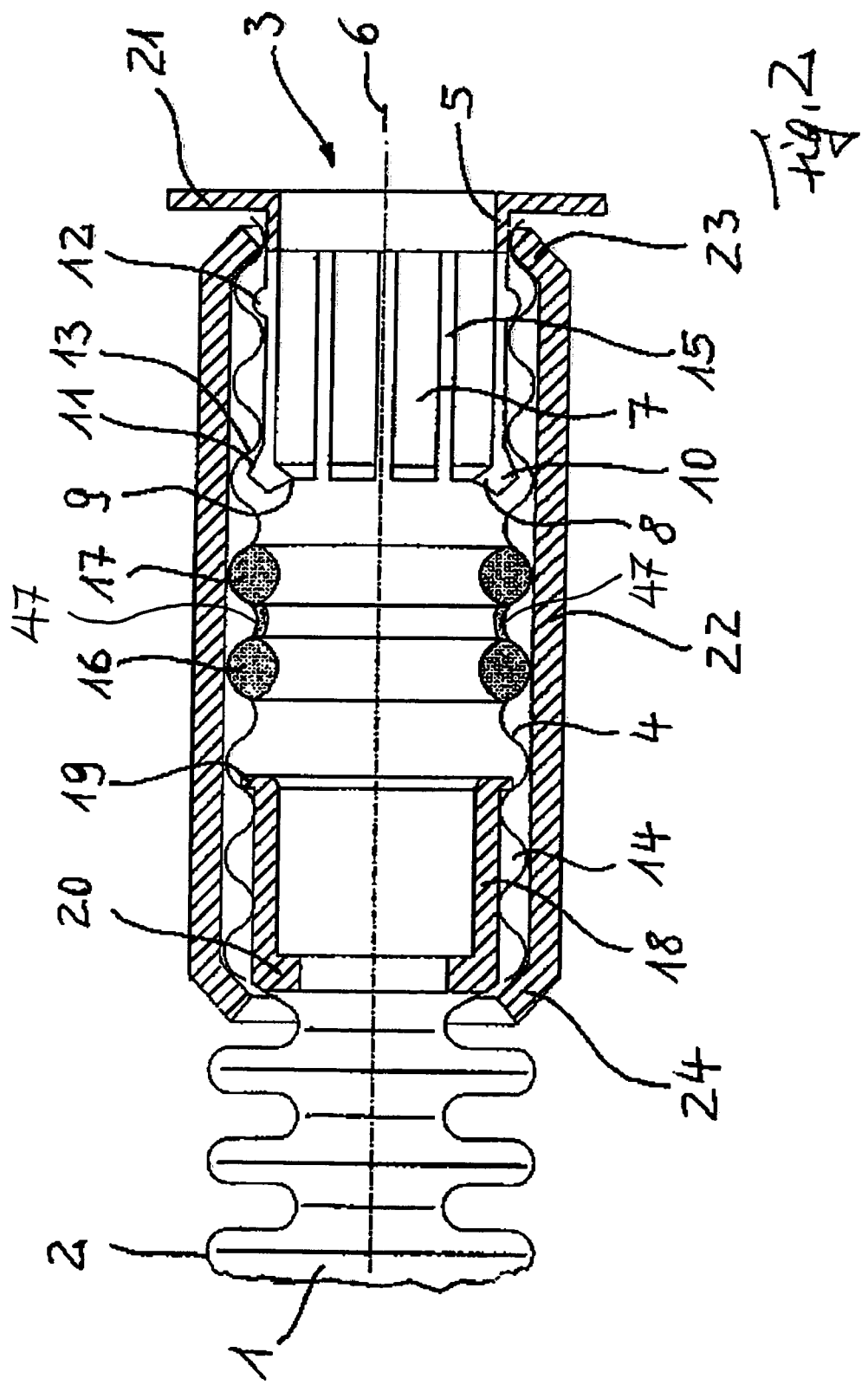
FIG. 2 shows a further construction of the subject matter according to FIG. 1.

FIG. 2 shows the development of the subject matter according to FIG. 1, in which reference characters already introduced are again used without a repetition of the description, insofar as the subject matter according to FIG. 1 is reproduced in the specific embodiment according to FIG. 2.

In contrast to the subject matter according to FIG. 1, in the specific embodiment according to FIG. 2 a support sleeve 22, made for example of metal, is placed onto stretched hose end 4; the inner diameter of this support sleeve corresponds to the outer diameter of stretched hose end 14, and with terminal bends 23, 24 the sleeve grasps terminal corrugations 14 of stretched hose end 4. The purpose of this support sleeve is to keep the components holding element 3, sealing rings 16, 17, and guide sleeve 18, which are used to form the plug connection, in alignment with respect to hose axis 6, in order in this way to facilitate handling, in particular during the plugging in of the end of the unprofiled pipe, and in addition to ensure that the end of the unprofiled pipe is not solely responsible for keeping the named components in alignment.

The next embodiment according to FIG. 3 is again based on a stretched end 4 of a corrugated hose, having corrugations 14 that are flatter in comparison with the rest of the hose. Here, in contrast to the embodiments described on the basis of FIGS. 1 and 2, a guide sleeve 25 is connected in one piece with an extension 26 that extends up to the free end of hose end 4, and whose outer diameter is greater than the outer diameter of guide sleeve 25, and which consequently is seated in radially further-widened corrugations 27 of the free end of stretched hose end 4.

The extension 26 has, connected to the guide sleeve 25, annular grooves 28, 29 for sealing rings 30, which correspond to sealing rings 16, 17 according to FIGS. 1 and 2, and which surround the plugged-in unprofiled pipe end 31 externally so as to form a seal. In order to complete the sealing of the plug connection, extension 26 is externally surrounded by a sealing ring 46 that abuts in one of corrugations 27 at hose end 4.

As can be seen, the components formed from guide sleeve 25 and extension 26 can easily be plugged into hose end 4, in such a way that locking projections 32 situated on the periphery of extension 26 come into engagement with one of corrugations 27 by protruding into the cross-section of the corrugation. In order to facilitate the plugging in of the cited component, locking projections 32 are provided on a side facing away from the hose end with an oblique surface 33, with the aid of which a radial widening of the hose end can be carried out during the plugging in of the cited component, in order to bring locking projections 32 into hose corrugation 27.

A holding element 34, having the construction already used and described in relation to the embodiments according to FIGS. 1 and 2, is now placed into the free end of extension 26. For this purpose, this free end 35 forms a ring chamber 36 in order to accept thicknesses 37 of holding fingers 38, which again extend from a terminal support ring 39 and are surrounded by an inner bore diameter 40 of free end 35 that is smaller than the outer diameter of ring chamber 36. Here as well, thickened portions 37 transition into the holding fingers 38 via an oblique surface 41, with this oblique surface 41 being situated opposite a corresponding oblique surface 42 on the free end 35 that connects the outer diameter of ring chamber 36 with the bore diameter 40.

Finally, here as well, the holding fingers 38 have terminal bends 43 that protrude inwardly for frictional connection in relation to the end 31 of the unprofiled pipe, and a collar 44 that extends outward radially is terminally connected to support ring 39 as a handle for the axial holding or displacement of holding element 34.

As a result of the design, which to this extent agrees with the embodiments according to FIGS. 1 and 2, the plugging in of unprofiled pipe end 31 up to an axial stop 45 of guide sleeve 25, and the removal of unprofiled pipe end 31 from this plug connection, take place in the manner already described, an unintentional detachment of the plug connection being effectively prevented in particular by oblique surfaces 41, 42.

Figure 3:
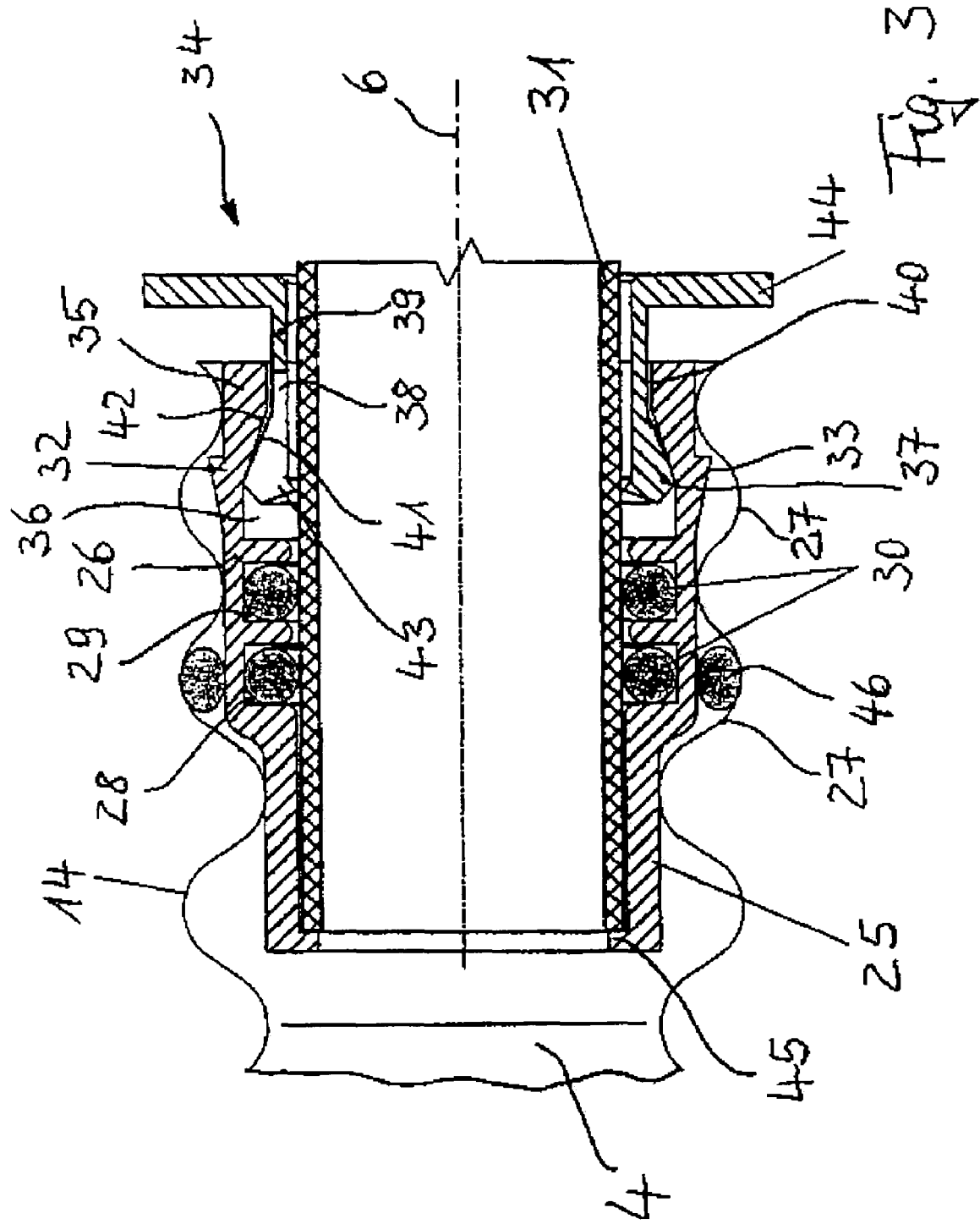
FIG. 3 shows a second embodiment of a plug connection in axial section.

The embodiment specified on the basis of FIG. 3 does have a slightly higher material outlay in comparison with the embodiments according to FIGS. 1 and 2. However, the additional introduction of extension 26 has the result that the constructive unit formed from guide sleeve 25 and extension 26, with the parts contained therein, can be pre-assembled at one time without the presence of the corrugated hose, and can be stored in this state, which can simplify assembly and can reduce required storage time.

Figure 4:
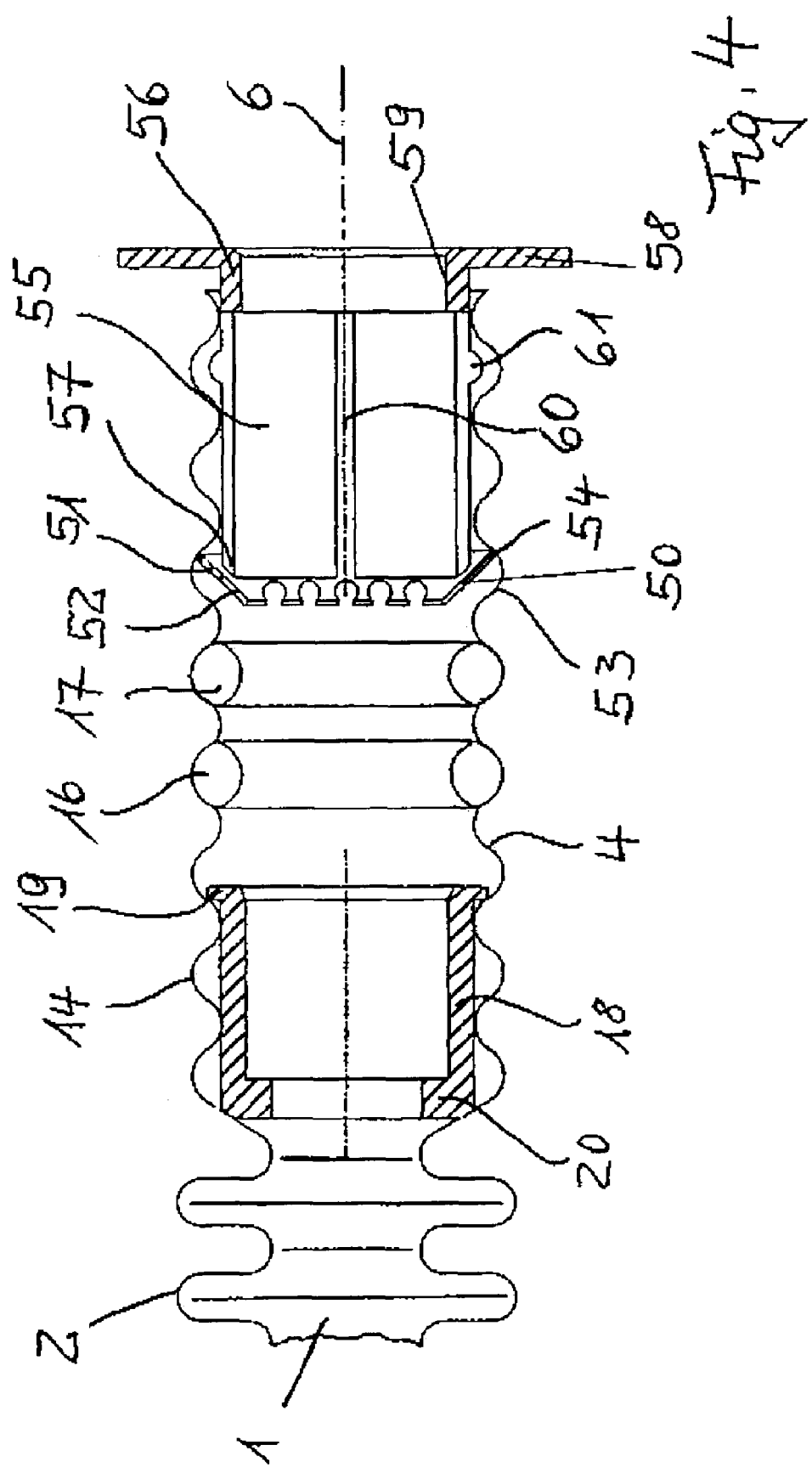
FIG. 4 shows a third embodiment of a plug connection in axial section.

FIG. 4 shows a further embodiment that agrees in parts with the subject matter according to FIG. 1, for which reason the reference characters used in FIG. 1 are repeated in FIG. 4 to this extent, without repetition of the description.

The essential difference is that according to FIG. 4, the holding element is formed as a lock washer 50 that tapers radially inwardly in essentially conical fashion from the opening of hose end 4, and that has, extending from a ring element 51 that is continuous in the circumferential direction, flexible tongues 52 that are distributed uniformly over the periphery and that extend radially inwardly in oblique fashion from the opening of hose end 4. The flexible tongues define, with their radially interior free end, a periphery that is smaller than the periphery of the end (not shown) of the unprofiled pipe. On the other hand, the outer diameter of ring element 51 is dimensioned so that it is smaller than the outer diameter of associated corrugation 53, but on the other hand is larger than the free inner cross-section of hose end 4.

In order to enable assembly of the lock washer 50, it, or its ring element 51, is provided with a parting line 54 that extends over the entire radial cross-section, so that lock washer 50 can contract radially in the known manner for the assembly, in such a way that its outer diameter is smaller than the inner cross-section of hose end 4. After the positioning in the associated hose corrugation 53, the spring force of lock washer 50 then causes it to expand radially into the position shown in FIG. 4.

If an unprofiled pipe end is now inserted, the pipe end pivots flexible tongues 52 radially outwardly corresponding to its outer cross-section, so that when the unprofiled pipe end has been plugged in the free ends of the flexible tongues are seated on the covering of the unprofiled pipe end. If, now, under the inner pressure that standardly prevails in the hose, the end of the unprofiled pipe tries to detach from the plug connection by moving to the right (as seen in FIG. 4), the flexible tongues 52 pivot in the counterclockwise direction and thereby dig into the covering of the end of the unprofiled pipe. Due to the slotting 54 of lock washer 50, a radial widening of lock washer 50 results from this, which however comes to an end when the outer periphery of ring element 51 finds support on associated hose corrugation 53, a centering and radial supporting of the unprofiled pipe end being simultaneously formed.

In order also to enable this plug connection to be detached when desired, an unlocking sleeve 55 is placed into the hose end before lock washer 50 in the direction towards the opening of hose end 4; this unlocking sleeve protrudes axially outward beyond hose end 4 with its one end 56, and extends up to flexible tongues 52 with its other end 57. For easier handling, the one end 56 of the unlocking sleeve is provided with a collar 58 that extends radially outward and that is axially at a distance from the hose end.

In order to situate unlocking sleeve 55 in captive fashion in hose end 4, in a further constructive embodiment the one end 56 of unlocking sleeve 55 is fashioned as a ring closed over its periphery, having an inner diameter 59 that corresponds to the outer diameter of the unprofiled pipe end. Extending from the ring forming the one end 56, the remaining length of unlocking sleeve 55 has longitudinal slots 60 whose axes are parallel and that are distributed uniformly over the periphery, and are open towards the other end 57 of unlocking sleeve 55, and has on the other hand a flange 61 that runs peripherally in externally interrupted fashion, and that protrudes into an associated hose corrugation, said flange having a cross-section that is smaller in the direction of hose axis 6 than is the corresponding cross-section of the hose corrugation. Due to the fact that the remaining length of the unlocking sleeve is provided with the mentioned longitudinal slots 60, for the assembly of the unlocking sleeve its diameter can be reduced, so that flange 61 can be introduced in unhindered fashion up to the associated hose corrugation.

If, now, the plug connection of an unprofiled pipe end is to be detached, unlocking sleeve 55 can be displaced to the left (as seen in FIG. 4) using the handle provided by collar 58, until flexible tongues 52 are pivoted radially outward by the other end 57, and thus lift off from the unprofiled pipe end, so that this pipe end can be withdrawn in unhindered fashion.

In the embodiment according to FIG. 4 as well, it can be useful to carry out a stabilization by means of an external supporting sleeve, corresponding to supporting sleeve 22 in FIG. 2.

The invention claimed is:

1. Plug connection between a corrugated hose (1), having corrugated inner and outer surfaces, and an unprofiled pipe (31), comprising a holding element (3, 34) that surrounds the unprofiled pipe (31) being connected with a hose end (4) for holding fast of the unprofiled pipe (31), and the unprofiled pipe end being surrounded by at least one sealing ring (16, 17, 30) that is situated before the holding element (3, 34) in a direction towards the hose (1), the sealing ring being connected with the hose (1) so as to form a seal,
wherein
the holding element (3, 34, 50) is situated in the hose end (4) and is held therein by mutual positively locking engagement in an axial direction, and a guide sleeve (18, 25) having an inner diameter that corresponds to an outer diameter of the unprofiled pipe (31) is situated before the holding element (3, 34, 50) on the other side of the sealing ring (16, 17, 30), the guide sleeve being held radially by the corrugated inner surface of the hose (1) practically play-free and through mutual positively locking engagement in the axial direction, and the sealing ring (16, 17) is placed from inside into a corrugation (14) of the hose (1), the sealing ring situated in an axial direction between the holding element (3) and the guide sleeve (18).

2. Plug connection as recited in claim 1,
wherein
the hose end (4) that accepts the holding element (3, 34, 50) and the guide sleeve (18, 25) is stretched in a direction of a flattening of the hose corrugations (14, 27).

3. Plug connection as recited in claim 1,
wherein
at least two sealing rings (16, 17) are situated in adjacent hose corrugations (14), that are connected with one another by a bridge that extends over the corrugation trough, situated between the hose corrugations (14) of the hose, outside an outer contour of the unprofiled pipe.

4. Plug connection as recited in claim 2,
wherein
the sealing ring (16, 17) has a lens-shaped axial cross-section that is matched to a stretched hose corrugations (14).

5. Plug connection as recited in claim 1,
wherein
the holding element (3) has holding fingers (7) that extend into the hose (1) parallel to the axis (6) thereof and that are located uniformly over a periphery at a distance (15) from one another in a circumferential direction and that can be moved radially in flexible fashion within limits, the holding fingers extending from a terminal support ring (5) that is positioned essentially in the hose end (4) and is closed over a periphery thereof and if necessary corresponds in an inner diameter to an outer diameter of the end of the unprofiled pipe, and that the holding fingers (7) have at free ends thereof a radially inward-directed bends (8) for the frictional arresting of the unprofiled pipe, the bends (8) extending, in the relaxed state of the holding fingers (7), radially inwardly into a region of an outer cross-section of the unprofiled pipe.

6. Plug connection as recited in claim 5,
wherein
at an end of the bends (8) there is fashioned an angled edge (9) for at least frictional seating on the unprofiled pipe.

7. Plug connection as recited in claim 5,
wherein
the free ends of the holding fingers (7) have a thickened portion (10) that is directed radially outward and that extends into an associated corrugation (14) of the hose (1), and that the holding element (3) has, in the area of the end of the holding fingers (7) connected to the support ring (5), a flange (12) that extends around the periphery in externally interrupted fashion and that extends into an associated corrugation (14) of the hose, and having a cross-section that is smaller in the direction of the hose axis (6) than is a corresponding cross-section of the hose corrugation (14), and that an axial distance between the thickened portions (10) of the holding fingers (7) and the flange (12) is fashioned such that the holding element (3) can be displaced axially between a position in which the thickened portions (10) do not contact an axially adjacent edge of the associated hose corrugation (14) and a position in which the thickened portions (10) are loaded radially inwardly by an edge (13), axially adjacent in the direction towards the hose end, of the associated hose corrugation (14), in a direction of pivoting of the holding fingers (7).

8. Plug connection as recited in claim 5,
wherein
the support ring (5) protrudes externally past the hose end (4), and has there at an end with a collar (21) that extends radially outward and that is always axially spaced at a distance from the hose end.

9. Plug connection as recited in claim 1,
wherein
the holding element is formed by a lock washer (50) that is placed into a corrugation (53) of the hose end (4), and the lock washer (50) has, extending from a ring element (51), flexible tongues (52) that are distributed uniformly over a periphery thereof and that extend radially inwardly from the hose end (4) in oblique fashion, in a direction towards the hose (1), and a cross-section described by free ends of the flexible tongues (52) is smaller than an outer cross-section of the end of the unprofiled pipe, and an outer diameter of the lock washer (50), or of the ring element (51) thereof, is smaller than an outer diameter of the associated hose corrugation (53), but is greater than a free inner cross-section of the hose (4).

10. Plug connection as recited in claim 9,
wherein
the lock washer (50) has a parting line (54) that extends over an entire radial cross-section thereof.

11. Plug connection as recited in claim 9,
wherein
the lock washer (50) is made of flexible sheet steel.

12. Plug connection as recited in claim 9,
wherein
an unlocking sleeve (55) having an inner diameter (59) corresponding to the outer diameter of the end of the unprofiled pipe is placed into the hose end (4), before the lock washer (50) in the direction towards the opening of the hose end (4), and the unlocking sleeve (55) protrudes axially outward with one end (56) thereof, and the flexible tongues (52) can be pivoted radially outward by an other end (57) of the unlocking sleeve (55) upon a corresponding axial displacement thereof.

13. Plug connection as recited in claim 12,
wherein
the one end (56) of the unlocking sleeve (55) has a collar (58) that extends outward radially and is axially spaced at a distance from the hose end.

14. Plug connection as recited in claim 12,
wherein
the one end (56) of the unlocking sleeve (55) is formed as a ring that is closed over a periphery thereof, having an inner diameter (59) corresponding to an outer diameter of the end of the unprofiled pipe, and the remaining length of the unlocking sleeve (55) has longitudinal slots (60) having axes that are parallel and that are distributed uniformly over a periphery thereof and are open towards the other end (57) of the unlocking sleeve (55), and a remaining length of the unlocking sleeve (55) has a flange (61) that extends around the periphery in externally interrupted fashion and that protrudes into an associated hose corrugation, and whose cross-section is smaller, in a direction of the axis (6) of the hose, than a corresponding cross-section of the hose corrugation, and the flange (61) has an axial position on the unlocking sleeve (55) that enables the axial displacement of the unlocking sleeve (55) in order to pivot the flexible tongues (52).

15. Plug connection as recited in claim 1,
wherein
the guide sleeve (18) has, on an end situated further from the hose end, a tapering (20) of the inner cross-section as an axial stop for the end of the unprofiled pipe, and has on its other end a collar (19) that protrudes outward radially for positively locking engagement in an associated hose corrugation (14).

16. Plug connection as recited in claim 1,
wherein
a hollow cylindrical support sleeve (22) is placed externally on the hose that axially overlaps a segment of the hose end, up to and including an area occupied by the guide sleeve (18), and whose inner diameter corresponds to an outer diameter of the hose (4), and is secured against axial displacement by terminal bends (23, 24) that grasp the corrugations of the hose.

17. Plug connection as recited in claim 1,
wherein
the guide sleeve (25) has an essentially hollow cylindrical extension (26) that extends up to the hose end, and a positively locking engagement is given between the components formed in this way and the hose (4), at least against axial displacement towards the hose end, and that the component bears on an outer covering at least one sealing ring (46) that enters into sealing engagement with an associated hose corrugation (14), and that the extension (26) has at least one inner ring chamber (28, 29) for the acceptance of the sealing ring (30) for the unprofiled pipe (31), and that the holding element (34) is situated in the extension (26) at an end facing away from the guide sleeve (25).

18. Plug connection as recited in claim 17,
wherein
the extension (26) is larger in cross-section than the guide sleeve (25), and is situated in a hose end whose cross-section has been widened correspondingly.

19. Plug connection as recited in claim 17,
wherein
the positively locking engagement between the component (25, 26) and the hose (4) is provided by locking projections (32) that are uniformly distributed on the extension (26) over at least one circumference, and that protrude radially outward into an associated hose corrugation (27), and the locking projections (32) have on a side facing away from the hose end an oblique surface (33) that defines a low angle with the direction of the hose axis (6).

20. Plug connection as recited in claim 17,
wherein
the holding element (34) has holding fingers (38) that extend into the extension (26), parallel to the axis (6) of the hose, and that are situated uniformly over the periphery at a distance (15) from one another in a circumferential direction, and can be moved radially in flexible fashion within limits, the holding fingers extending from a terminal support ring (39) that is positioned essentially in an area of a free end of the extension (26) and is closed over its periphery and if necessary corresponds in inner diameter to the outer diameter of the end of the unprofiled pipe, and that the holding fingers (38) have at their free ends radially inward-directed bends (43) for frictional arresting of the unprofiled pipe (31), the bends (43) extending, in a relaxed state of the holding fingers (38), radially inwardly into a region of an outer cross-section of the unprofiled pipe (31).

21. Plug connection as recited in claim 20,
wherein
at ends of the bends, an angled edge is formed for at least frictional seating on the unprofiled pipe (31).

22. Plug connection as recited in claim 20,
wherein
the free ends of the holding fingers (38) have a thickened portion (37) that is radially externally oriented, and protrudes into a radial widening (36) of a free inner cross-section of the extension (26), and an outer cross-section of each of the thickened portions (37) is connected with an outer surface of an associated holding finger (38) via an oblique surface (41) that extends in a direction towards the support ring (39) and forms a low angle in relation to the axial direction (6) of the hose (4), and the widening (36) has a beveling (42) that corresponds to the oblique surfaces (41).

23. Plug connection as recited in claim 20,
wherein
the support ring (39) protrudes externally past a free end of the extension (26), and there has at an end thereof a collar (44) that extends radially outward and is always axially at a distance from the end of the extension (26).

24. Plug connection as recited in claim 20, wherein the guide sleeve (25) has at one end that is further removed from the free end of the hose (4) or of the extension (26) a tapering (45) of an inner cross-section as an axial stop for the end (31) of the unprofiled pipe.

* * * * *